(12) United States Patent
Cusack et al.

(10) Patent No.: US 9,726,031 B2
(45) Date of Patent: Aug. 8, 2017

(54) PISTON RING COATED CARBON SEAL

(71) Applicants: Maria Cusack, East Hartford, CT (US); Arnold Zandonella, East Hartford, CT (US)

(72) Inventors: Maria Cusack, East Hartford, CT (US); Arnold Zandonella, East Hartford, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 788 days.

(21) Appl. No.: 13/630,950

(22) Filed: Sep. 28, 2012

(65) Prior Publication Data

US 2014/0091535 A1 Apr. 3, 2014

(51) Int. Cl.
*F01D 11/00* (2006.01)
*F16J 15/3284* (2016.01)

(52) U.S. Cl.
CPC .......... *F01D 11/003* (2013.01); *F01D 11/005* (2013.01); *F16J 15/3284* (2013.01)

(58) Field of Classification Search
USPC ........................................ 277/348, 416, 422
See application file for complete search history.

(56) References Cited

U.S. PATENT DOCUMENTS

| | | | |
|---|---|---|---|
| 5,174,584 A * | 12/1992 | Lahrman | 277/400 |
| 5,218,816 A | 6/1993 | Plemmons et al. | |
| 5,284,347 A * | 2/1994 | Pope | 277/305 |
| 6,145,840 A * | 11/2000 | Pope | 277/348 |
| 6,149,163 A | 11/2000 | Brown et al. | |
| 2003/0185669 A1 | 10/2003 | Brauer et al. | |
| 2006/0133928 A1 | 6/2006 | Bracken et al. | |
| 2007/0096399 A1* | 5/2007 | Miller et al. | 277/377 |
| 2007/0235946 A9* | 10/2007 | Garrison et al. | 277/411 |
| 2008/0308425 A1 | 12/2008 | Mittendorf et al. | |
| 2009/0051119 A1 | 2/2009 | Glahn et al. | |
| 2011/0027576 A1 | 2/2011 | Kool et al. | |
| 2012/0082551 A1 | 4/2012 | Macchia et al. | |
| 2012/0247168 A1 | 10/2012 | Mortzheim et al. | |
| 2013/0069313 A1* | 3/2013 | Sonokawa | 277/300 |
| 2013/0106061 A1* | 5/2013 | Ruggiero et al. | 277/411 |

OTHER PUBLICATIONS

International Search Report and Written Opinion for International Application No. PCT/US2013/052177 completed on Oct. 17, 2013.

* cited by examiner

*Primary Examiner* — Vishal Patel
*Assistant Examiner* — Thomas Neubauer
(74) *Attorney, Agent, or Firm* — Carlson, Gaskey & Olds, P.C.

(57) ABSTRACT

A seal assembly for separating a relatively high pressure area from a relatively low pressure area includes a first seal carrier having a circumferential body that has a land thereon and a seal. The seal has a circumferential body located within the first seal carrier, the seal having a first surface for sealing against the first land and a second surface and wherein one of the first surface or the first land has an unmachined wear coating that resists fretting and vibration.

19 Claims, 2 Drawing Sheets

PISTON RING COATED CARBON SEAL

BACKGROUND OF THE INVENTION

The present invention relates generally to a sealing arrangement for a bearing compartment in a turbine engine and more particularly, to a coated seal for use therewith.

BACKGROUND

A bearing compartment in a multiple spool gas turbine engine may contain oil that lubricates bearings that support an inner rotor shaft and an outer rotor shaft. The inner and the outer rotor shafts are separated by a gap filled with working medium gas. The working medium gas provides cooling for the rotor shafts, but is warmer than the temperature inside the bearing compartment. An intershaft seal prevents the working medium gas from leaking into the oil compartment and prevents the oil from leaking out of the compartment. The intershaft seal traditionally employs two face seals, to seal to the shafts, and a ring seal therebetween, to limit leakage between the face seals.

SUMMARY

According to an embodiment disclosed herein, a seal assembly for separating a relatively high pressure area from a relatively low pressure area includes a first seal carrier having a circumferential body, the first seal carrier having a first land thereon; and, a seal having a circumferential body located within the first seal carrier, the seal having a first surface for sealing against the first land and a second surface and wherein one of the first surface or the first land has an unmachined wear coating that resists fretting and vibration.

According to any previous claim made herein, the seal does not contact the first seal carrier but for contact of the first surface with the first land.

According to any previous claim made herein, the coating is electroless nickel.

According to any previous claim made herein, the first surface has an unmachined wear coating that resists fretting and vibration.

According to any previous claim made herein, the first land has an unmachined wear coating that resists fretting and vibration.

According to any previous claim made herein, a second seal carrier has a circumferential body that moves relative to the first seal carrier the second seal carrier having a second land upon which the second surface is disposed thereupon.

According to any previous claim made herein, the second seal carrier extends around the first seal carrier.

According to any previous claim made herein, the second surface may move across the second land when forced by a pressure differential between the high pressure area and the low pressure area.

According to any previous claim made herein, the second surface has an unmachined wear coating that resists fretting and vibration.

According to any previous claim made herein, the second land has an unmachined wear coating that resists fretting and vibration.

According to a further non-limiting embodiment disclosed herein, a seal for separating a relatively high pressure area from a relatively low pressure area includes a seal having a circumferential body, the seal having a first surface for sealing against a land and a second surface wherein the first surface has an unmachined wear coating that resists fretting and vibration.

According to any previous claim made herein, the coating is electroless nickel.

According to any previous claim made herein, the second surface has an unmachined wear coating that resists fretting and vibration.

According to any previous claim made herein, further including a seal carrier having a land thereon for cooperating with the first surface.

According to any previous claim made herein, the seal carrier houses the seal but does not touch it but for contact between the land and the first surface.

According to any previous claim made herein, the first surface is radially aligned.

According to any previous claim made herein, the first surface the second surface are perpendicular to each other.

BRIEF DESCRIPTION OF THE DRAWINGS

The various features and advantages of the disclosed examples will become apparent to those skilled in the art from the detailed description. The figures that accompany the detailed description can be briefly described as follows.

DETAILED DESCRIPTION

Figure 1:
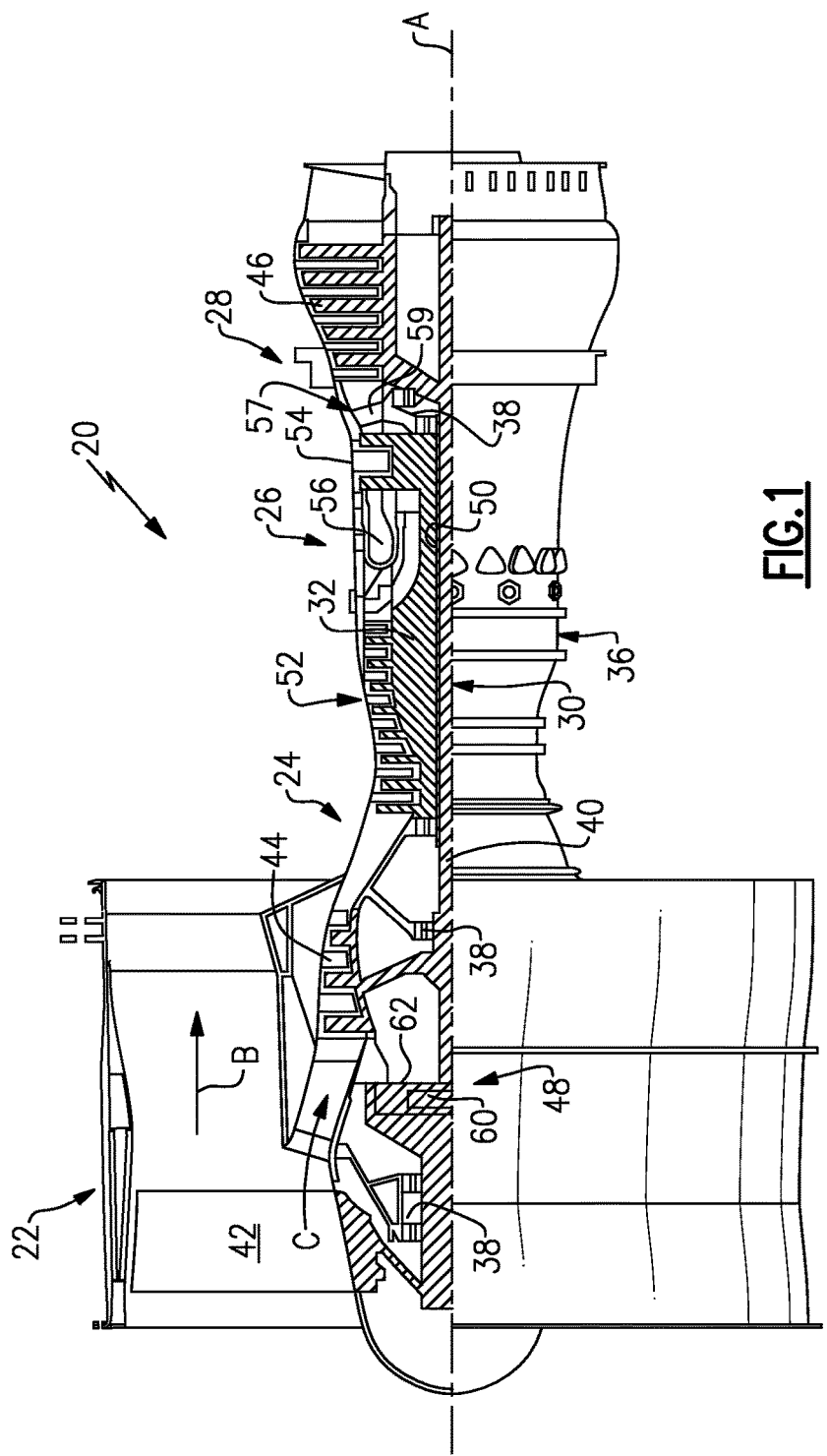
FIG. 1 shows a gas turbine engine in which an embodiment of an invention is shown.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three (or more) spooled architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure (or first) compressor section 44 and a low pressure (or first) turbine section 46. The inner shaft 40 is connected to the fan 42 through a geared architecture 48 to drive the fan 42 at a lower speed than the low speed spool 30. The geared architecture comprises a gear assembly 60 enclosed within a gear housing 62. The gear assembly 60 couples the inner shaft 40 to a rotating fan structure. The high speed spool 32 includes an outer shaft 50 that interconnects a high pressure (or second) compressor section 52 and high pressure (or second) turbine section 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a star gear system (sun gear in meshing engagement with a plurality of star gears supported by a carrier and in meshing engagement with a ring gear) or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

Figure 2:
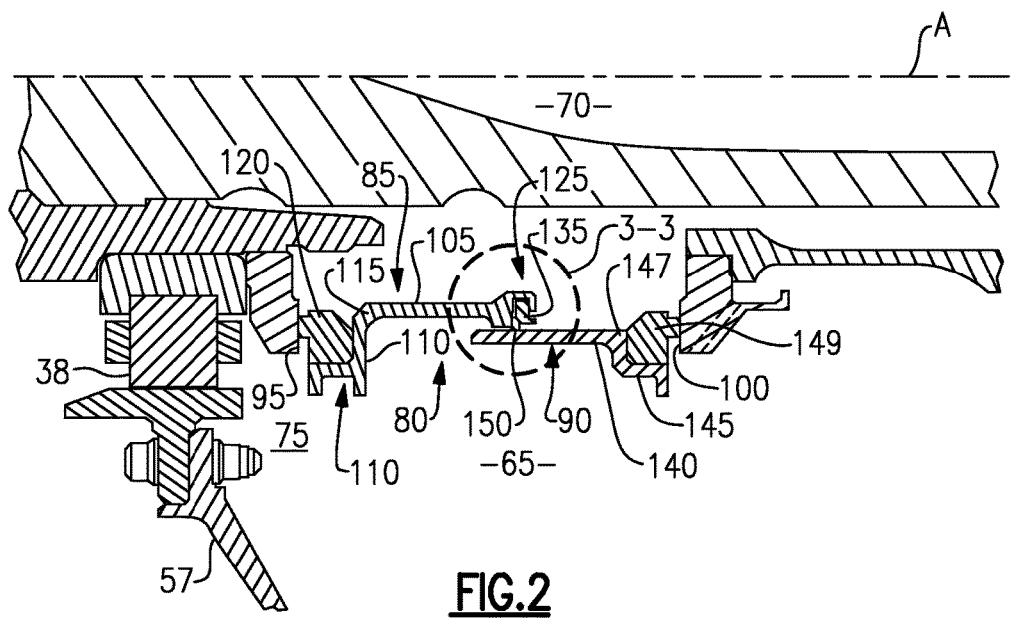
FIG. 2 shows an embodiment of a coated seal for use in a bearing compartment shown in FIG. 1.

Referring now to FIG. 2, a bearing compartment 65 having a given static pressure (e.g., a low pressure) therein is adjacent the side 70 of the gas turbine engine 20 having a second static pressure (e.g., a high pressure) greater than the given pressure (e.g., the low pressure). Oil 75 is disposed within the bearing compartment 65.

A seal assembly 80 separates the high pressure side 70 from the low pressure bearing compartment 65. The seal assembly 80 comprises a forward seal carrier 85 which may be circumferential, an aft circumferential seal carrier 90, a forward land 95 cooperating with the forward seal carrier 85 and an aft land 100 cooperating with the aft seal carrier 90. The forward seal carrier 85 has circumferential body 105, an L-shaped radially outwardly extending seal holder 110 extending from a forward end 115 of the forward seal carrier 85. A forward seal 120 is disposed within the L-shaped radially inwardly extending seal holder 110. A U-shaped seal holder 125 extends from an aft end 130 of the circumferential body 105. A piston ring 135 is disposed within the U-shaped seal holder 125 as will be discussed infra.

The aft seal carrier 90 includes a circumferential body 140, an L-shaped radially outwardly extending seal holder 145 extending from an aft end 147 thereof. A seal 149 fits within the L-shaped radially inwardly extending seal holder 145 to engage the land 100. The seal also has a sealing land (or surface) 150 which engages the land 100. The seals 149 and 120 are typically carbon made of carbon but other materials may be used. The aft seal carrier 90 may act as a piston and move axially relative to the forward seal carrier 85

Figure 3:
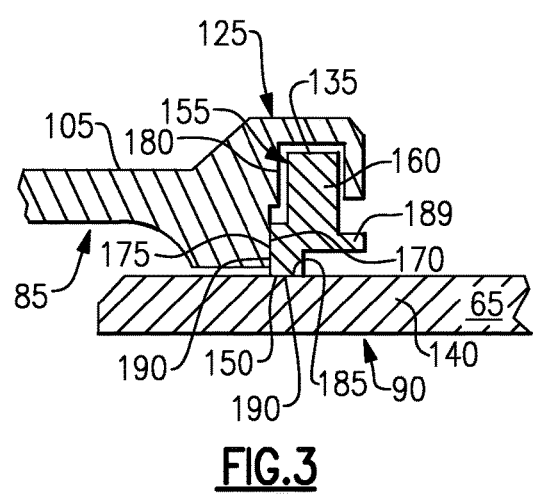
FIG. 3 shows an embodiment of a coated seal taken along the lines 3-3 of FIG. 2.

Referring now to FIG. 3, the seal holder 125, which may be U-shaped, holds a radial inner area of body 155 of the piston ring 135. The body 155 has a radial inner profile 160 that does not touch the seal holder 125. The piston ring 135 has an axially forward face 170 for cooperating with the radially outer wall 175 of the seal holder 125 that is parallel to, but not in plane with a radially inner wall 180 of the seal holder 125. The body 155 has a radially outward surface 185 engaging land 150 on the aft carbon carrier.

The body of the piston ring 135 has an axially aft extending portion 189 that prevents the piston ring from being inserted in the seal holder 125 in a backwards position. Such installation is not possible because if there is contact between the aft extending portion 189 and the radially outer wall 175, the body 155 will not fit in seal holder 125.

During operation, as the pressure of flow C increases on the high pressure side 70, and the pressure urges the piston ring 135 axially forward across the land 150 so the axially forward face 170 engages the radially outer wall 175 of the seal holder 125 to effectuate a seal therebetween. The relative pressure also tends to force the piston ring 135 radially outer face 185 against the land 150.

This piston ring 135 is usually made of carbon. However, the Inventors have discovered that the piston ring 135 is subject to fret wear and vibratory wear as the upstream and downstream carbon carriers 80 and 90 move relative to each other. Where the piston ring 135 is subject to rubbing and chafing caused by "fretting" along with regular vibratory modes caused by vibratory modes that are normally experienced in rotating machinery premature failure of a sealing function may occur.

As a result, the applicants have coated the radially outer wall 175 and the radially outer face 185 of the piston ring with electroless nickel 190 that can withstand the fret and vibratory wear experienced by the piston ring. A electroless plating process is followed by using a reducing agent such as sodium hypophosphite to produce a negative charge on the piston ring 135 that draws nickel ions in solution thereto to coat the part. The piston ring 135 may be masked to coat only the desired portions thereof like the axial forward face 170.

One of the advantages of electroless nickel is that it does not require machining and other coatings that are known to resist fretting and vibratory modes that do not require machining (e.g., "unmachined") may be used herein. Furthermore, instead of coating the axial forward face 170 and radially outer face 185 of the piston ring 135, one may choose to coat the radially outer wall 175 or the land of the forward seal carrier 85 or the land 150 of the axially aft seal carrier 90. The surfaces subject to the fretting and vibratory forces (e.g., axial forward face 170, radially outer face 185, or the radially outer wall 175 or the land 150) may be the only ones coated.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A seal assembly for separating a relatively high pressure area from a relatively low pressure area comprises:
   a first seal carrier having a circumferential body, said first seal carrier having a first land thereon; and
   a seal having a circumferential body located within said first seal carrier, said seal having a first surface and a second surface, said first surface for sealing against said first land, and wherein one of said first surface and said first land has an unmachined wear coating thereon.

2. The seal assembly of claim 1 wherein said seal does not contact said first seal carrier but for contact of said first surface with said first land.

3. The seal assembly of claim 1 wherein said coating is electroless nickel.

4. The seal assembly of claim 1 wherein said first surface has an unmachined wear coating thereon.

5. The seal assembly of claim 1 wherein said first land has an unmachined wear coating thereon.

6. The seal assembly of claim 1 further comprising:
   a second seal carrier having a circumferential body that moves relative to said first seal carrier, said second seal carrier having a second land upon which said second surface is disposed thereupon.

7. The seal assembly of claim 6 wherein said second land is positioned radially outward of said seal.

8. The seal assembly of claim 6 wherein said second surface has an unmachined wear coating thereon.

9. The seal assembly of claim 6 wherein said second land has an unmachined wear coating thereon.

10. A seal for separating a relatively high pressure area from a relatively low pressure area comprises:
    a seal having a circumferential body, said seal having a first surface for sealing against a land and a second surface wherein said first surface has an unmachined wear coating thereon.

11. The seal of claim 10 wherein said coating is electroless nickel.

12. The seal of claim 10 wherein said second surface has an unmachined wear coating thereon.

13. The seal of claim 10 further comprising:
    a seal carrier having a land thereon for cooperating with said first surface.

14. The seal of claim 13 wherein said seal carrier houses said seal but does not touch it but for contact between said land and said first surface.

15. The seal of claim 10 wherein said first surface said second surface are perpendicular to each other.

16. The seal assembly of claim 6 wherein said first seal carrier includes a seal holder extending radially outward from a forward end of said circumferential body of said first seal carrier, and wherein a forward seal is disposed in said seal holder of said first seal carrier.

17. The seal assembly of claim 16 wherein said second seal carrier includes a seal holder extending radially outward from an aft end of said circumferential body of said second seal carrier, and wherein an aft seal is disposed in the seal holder of the second seal carrier.

18. The seal assembly of claim 17 wherein said forward seal is forward of said seal, and wherein the aft seal is aft of the both said forward seal and said seal.

19. The seal assembly of claim 16 wherein both said first seal carrier and said second seal carrier are substantially L-shaped.

* * * * *